(12) United States Patent
Tiesler et al.

(10) Patent No.: US 7,270,620 B2
(45) Date of Patent: Sep. 18, 2007

(54) PLANETARY GEAR CARRIER

(75) Inventors: Peter Tiesler, Meckenbeuren (DE); Eberhard Biermann, Ravensburg (DE)

(73) Assignee: ZF Friedrichshafen AG, Friedrichshafen (DE)

(*) Notice: Subject to any disclaimer, the term of this patent is extended or adjusted under 35 U.S.C. 154(b) by 170 days.

(21) Appl. No.: 10/545,957

(22) PCT Filed: Feb. 14, 2004

(86) PCT No.: PCT/EP2004/001406

§ 371 (c)(1),
(2), (4) Date: Aug. 15, 2005

(87) PCT Pub. No.: WO2004/074715

PCT Pub. Date: Sep. 2, 2004

(65) Prior Publication Data

US 2006/0160654 A1    Jul. 20, 2006

(30) Foreign Application Priority Data

Feb. 20, 2003 (DE) .............................. 103 07 221

(51) Int. Cl.
*F16H 57/04* (2006.01)
(52) U.S. Cl. ..................................................... 475/159
(58) Field of Classification Search ................ 475/159, 475/331
See application file for complete search history.

(56) References Cited

U.S. PATENT DOCUMENTS 5,480,362 A    1/1996    Tanaka et al.
5,702,320 A    12/1997   Brassai et al.
5,910,063 A    6/1999    Kato
6,602,158 B2   8/2003    Wildeshaus

FOREIGN PATENT DOCUMENTS

| DE | 41 36 040 C1 | 1/1993 |
|---|---|---|
| DE | 195 34 791 A1 | 3/1997 |
| DE | 296 23 080 U | 11/1997 |
| DE | 197 36 686 A1 | 3/1998 |
| DE | 197 56 253 A1 | 6/1998 |
| DE | 197 27 360 A1 | 9/1998 |
| DE | 197 18 030 A1 | 11/1998 |
| DE | 199 45 089 A2 | 3/2001 |
| DE | 199 60 157 A1 | 6/2001 |
| EP | 0 738 843 A2 | 10/1996 |

*Primary Examiner*—Dirk Wright
(74) *Attorney, Agent, or Firm*—Davis Bujold & Daniels, P.L.L.C.

(57) ABSTRACT

A planetary gear carrier for a planetary gearset comprising a web for receiving planetary gear pins on which planetary gears of the planetary gearset are disposed, also comprises an oil baffle which axially abuts the web on the side of the web plate facing away from the planetary gears and forms a lubricating oil chamber in conjunction with the web for guiding an amount of lubricating oil into lubricating holes of the planetary gear pin. The web has a locking profile for a positive connection between the planetary gear carrier and a gearbox component, which is axially adjacent to the planetary gear carrier on the side of the web facing away from the planetary gears. The oil baffle comprises a device for axially securing the gear component abutting the planetary gear carrier to the locking profile of the web in a mounted state.

25 Claims, 6 Drawing Sheets

PLANETARY GEAR CARRIER

This application is a national stage completion of PCT/EP2004/001406 filed Feb. 14, 2004 which claims priority from German Application Serial No. 103 07 221.7 filed Feb. 20, 2003.

FIELD OF THE INVENTION

The invention relates to a planetary gear carrier for a planetary gearset.

BACKGROUND OF THE INVENTION

Planetary gearsets comprising a sun wheel, internal gear, planetary gears and a rotating planetary gear carrier are known, in general. Typically, the planetary gear carrier comprises a hub and a web plate in which planetary gear pins are axially inserted on a defined reference diameter. The planetary gears are typically seated on the planetary gear pin by way of floating bearings or needle bearings with the necessary lubricating oil quantity for lubrication of this planetary gear bearing being fed from the side of the web plate facing away from the planetary gears into an axial blind hole of the planetary gear pin and being fed from there via radial bores of the planetary gear pins of the planetary gear bearing opening into the axial bores. Typically, the lubricating oil is fed from an inside diameter of the (rotating) planetary gear carrier or web plate in such a way that the lubricating agent flows radially outward along the web plate due to the centrifugal force on the web plate. To accumulate lubricating agent in the area of the axial lubricating oil feed into the planetary gear pins, it has been suggested in DE 197 36 686 A1 to attach a diaphragm plate axially to the web plate, which extends in the radial direction across the area of the axial lubricating agent feed into the planetary gear pins and together with the diaphragm plate forms a lubricating oil chamber. The lubricating agent arriving from the inside is thus accumulated in the lubricating oil chamber and is guided from there in the axial bores of the planetary gear pins.

From DE 197 18 030 A1, for example, a planetary gear carrier with a disk-shaped oil control plate is known, in which the oil control plate is a formed plastic part with a star-shaped outer contour and angled, axially extending tabs. To form a lubricating oil chamber, the oil control plate in the mounted state covers the areas of the axial lubricating oil feed in the individual planetary gear pins in an axially spaced manner, wherein the outer contour of the oil control plate rests axially against the planetary gear carrier. The angled tabs of the oil control plate comprise retaining clips and engage in the mounted state axially in the planetary gear carrier on a diameter smaller than the planetary gear bolt reference diameter, while the retaining clips latch to the inside circumference of a basket-shaped section of the planetary gear carrier.

It is the object of the invention to further develop a planetary gear carrier comprising an oil baffle axially abutting a web plate of the planetary gear carrier with respect to its functionality and installation in the gearbox.

SUMMARY OF THE INVENTION

Proceeding from the aforementioned state of the art, the planetary gear carrier for a planetary gearset, according to the invention, comprises a web for accommodating planetary gear pins, on which planetary gears of the planetary gearset are seated. On the side of the web facing away from the planetary gears, an oil baffle axially abuts an end face of the web and is attached to the web, preferably to the end face of the web. The oil baffle covers the planetary gear pins in an axially spaced manner and, together with the web, forms a lubricating oil chamber that is open towards the inside diameter for guiding a lubricating oil flow to a planetary gear bearing on the outside diameter of the respective planetary gear pins. Lubricating oil that is fed to the lubricating oil chamber from an inside diameter is conducted from the lubricating oil chamber in axial lubricating holes of the planetary gear pins and from there via radial lubricating oil bores of the planetary gear pins to the planetary gear bearing, with these axial lubricating holes of the planetary gear pins opening into the lubricating oil chamber. The web comprises a catch profile for positively connecting the planetary gear carrier to a gearbox element, which axially abuts the planetary gear carrier on the side of the web facing away from the planetary gears. According to the invention, it is provided that the oil baffle comprises a device for axially securing the gearbox element abutting the planetary gear carrier on the catch profile of the web in the assembled state.

This additional functionality of the oil baffle enables very compact, length-saving nesting of the planetary gear carrier, oil baffle and the gearbox element abutting the planetary gear carrier and assembly of the components is very simple and inexpensive. Such a gearbox element abutting the planetary gear carrier can be, for example, a disk carrier or another planetary gear carrier or an internal gear of an abutting planetary gearset.

In a preferred embodiment after its assembly the oil baffle is non-detachably connected to the web and at least largely oil-tight to the web, for example, by way of rolling on a diameter greater than a reference diameter of the planetary gear pins or by way of riveting on the end face of the web facing the lubricating oil chamber. The oil baffle preferably comprises angled tabs on a diameter smaller than the reference diameter of the planetary gear pins, said tabs extending roughly parallel to the planet pin axis axially in the opposite direction of the planetary gear pins and, during assembly of the gearbox element abutting the planetary gear carrier to the catch profile of the web that has been completed with the oil baffle, has been added, axially engaging in corresponding recesses of the gearbox element.

In this case the device with which the gearbox element abutting the planetary gear carrier is axially secured on the catch teeth of the web in the mounted state can be designed as a crimped closure. In this case, after sliding a catch profile of the gearbox element abutting the planetary gear carrier on the catch profile of the web plate, the tabs of the oil baffle extend through the corresponding recesses of the gearbox element and are then bent on the side of the recesses facing away from the web.

In another embodiment, the device with which the gearbox element abutting the planetary gear carrier is axially secured on the catch teeth of the web in the mounted state can be designed as a bayonet lock or snap-fit closure. In this case, the tabs of the oil baffle are elastic and spring-loaded and snap into or onto the corresponding recesses of the gearbox element in the circumferential direction and/or radial direction during assembly of the gearbox element abutting the planetary gear carrier on the catch profile of the web.

In another embodiment, it is suggested designing the device with which the gearbox element abutting the planetary gear carrier is axially secured on the catch teeth of the web in the mounted state as a rivet or weld closure with the tabs of the oil baffle being riveted or welded to or in the recesses of the gearbox element after sliding a catch profile of the gearbox element abutting the planetary gear carrier on the catch profile of the web.

In yet another embodiment, the device with which the gearbox element abutting the planetary gear carrier is axially secured on the catch teeth of the web in the mounted state can also be designed as a screw connection. In this case, after positively joining the catch profiles of the gearbox element abutting the planetary gear carrier and of the web plate, the tabs of the oil baffle extend through the corresponding recesses of the gearbox element and are then screwed to the gearbox element on the side of the recesses facing away from the web.

For the purpose of improving the lubricating oil supply to the planetary gear pine arranged on a smaller radius, it is suggested to provide a seal axially between the oil baffle and the end face of the web facing the lubricating oil chamber to further develop a planetary gear carrier with planetary gear pins that are arranged on different reference diameters. The axial seal-contact image of this seal creates a closed contour, which engages around the area of the axial lubricating oil feed of the individual planetary gear pins radially on the outside, and extends in the sections located in the circumferential direction between the individual planetary gear pins on a diameter smaller than or equal to the reference diameter of the radially inner planetary gear pins. This way the lubricating oil, which is fed radially from the inside to the outside in the lubricating oil chamber, is distributed at least substantially evenly among the inner and outer planetary gear pins and prevents insufficient lubrication of the radially inner planetary gear bearing.

DESCRIPTION OF THE DRAWINGS

The invention will now be describe, by way of example, with reference to the accompanying drawings with equivalent components being designated by the same reference numerals, in which.

DETAILED DESCRIPTION OF THE INVENTION

Figure 1:
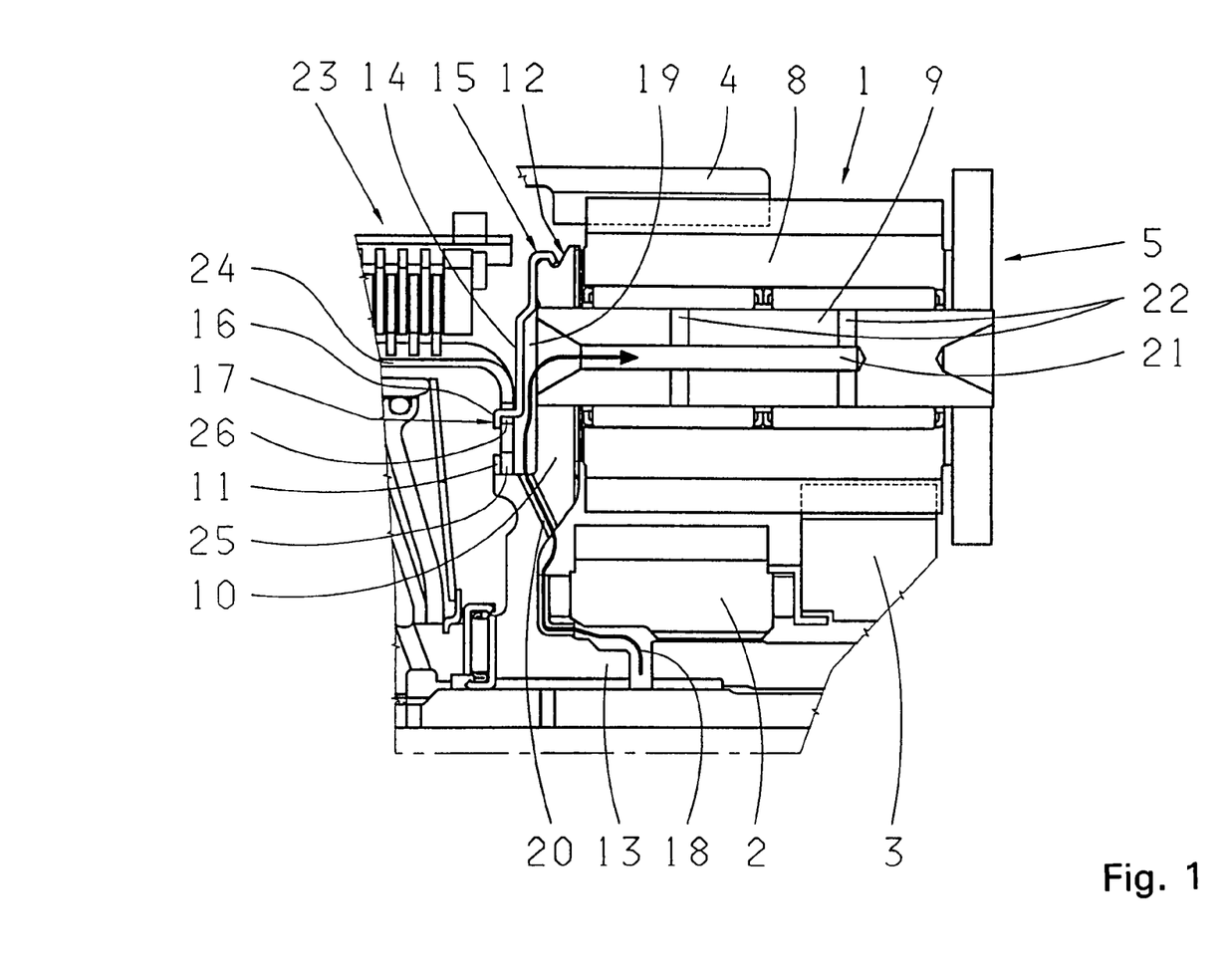
FIG. 1 is an exemplary embodiment of a planetary gear carrier according to the invention.

FIG. 1 shows a sectional view of an exemplary embodiment of the inventive planetary gear carrier in the mounted state. Reference numeral 1 designates a planetary gearset—here in the familiar Ravigneaux type—which comprises a first sun wheel 2, a second sun wheel 3, an internal gear 4 and a planetary gear carrier 5. The planetary gear carrier 5 comprises a web 10 for accommodating planetary gear pins, on which planetary gears are seated, where the planetary pins extend in the familiar fashion at a right angle to the end face of the web 10. In the illustrated sectional view, outer planetary gears of the Ravigneaux-type planetary gearset, which mesh with the internal gear 4 and the second sun wheel 3, have been designated with reference numeral 8, an outer planetary gear pin with 9. Inner planetary gears, which mesh with the first sun wheel 2 and the outer planetary gears 8 and are also arranged on the Ravigneaux-type planetary gearset, and their inner planetary gear pins are not illustrated in the sectional view in FIG. 1. By way of example, the web 10 is designed as one piece with a hub 13 of the planetary gear carrier 5.

Axially adjacent to the planetary gearset 1, on the side of the web 10 facing away from the planetary gear 8, a gearbox element abutting the planetary gearset 1 is arranged here, by way of example, a control element 23. A disk carrier 24 which, by way of example, is designed as an inside disk carrier, axially abuts the web 10 and is positively connected to the web 10, via a catch profile 25 which, in the mounted state, engages in a corresponding catch profile 11 of the web 10, which is arranged on the side of the web 10 facing away from the planetary gears. During assembly of the disk carrier 24 to the (completed) planetary gear carrier 5, the catch profile 25 of the disk carrier 24 is slid on the catch profile 11 of the web 10 in the axial direction.

To lubricate the planetary gear bearing, the outer planetary pin 9 and the not illustrated, inner planetary pins of the planetary gearset 1 comprise axial lubricating holes 21 and radial lubricating holes 22 opening into said axial lubricating holes 21 in the familiar fashion. The axial lubricating holes 21 are designed as blind holes open towards the end face of the web 10. The amount of lubricating oil required for lubrication of the planetary gear bearing is thus fed from the side of the web 10 facing away from the planetary gears into the axial lubricating holes of the planetary bolt.

In the illustrated embodiment, due to the centrifugal force, lubricating oil fed from an inside diameter of the planetary gearset 1 flows radially outward initially through a lubricating hole 20 of the rotating web 10 and subsequently along the end face of the web 10 to its side facing away from the planetary gears. Abutting the end face of the web 10 on the web's side facing away from the planetary gears. A disk-shaped oil baffle 14, together with the web 10, forms a lubricating oil chamber 19 that is open towards the inside diameter, and is provided for improving the lubricating oil supply to the axial lubricating holes 21 of the planetary gear pins. The oil baffle 14 covers the planetary gear pins in an axially spaced manner and rests against the web 10 in one section, which has a larger diameter than the reference diameter of the planetary gear pin 9. Attachment of the oil baffle 14 to the web 10 is beneficially designed simply as a roll in the illustrated embodiment, with a roll section 15 of the oil baffle 14 overlapping the outside diameter of the web 10 axially in the direction of the planetary gear 9 and being rolled in the mounted state on an undercut 12 of the web 10. The roll is expediently designed at least largely in an oil-tight manner. Of course, a radial groove can be provided instead of the undercut 12. Both the undercut 12, as well as a correspondingly designed radial groove at the circumference of the web 10, ensure secure fastening (at least) in the axial direction of the oil baffle 14 to the planetary gear carrier 5 or the web 10. Of course, the oil baffle 14 can also be suitably attached axially to the end face of the web 10 facing the lubricating oil chamber 19. The only essential aspect in this context is that the axial connection between oil baffle and web can transmit forces, which are applied on the oil baffle from the outside, to the planetary gear carrier to a certain degree and that a lubricating oil chamber, which is open towards the inside diameter, is formed in which the lubricating oil flowing from the inside out, along the end face of the web, can get and accumulate there. The lubricating oil accumulated in the lubricating oil chamber 19 is conducted in the familiar fashion in the axial lubricating holes 21 of the planetary gear pins. The corresponding lubricating oil flow has been designated by a reference numeral 18 in FIG. 1.

According to the invention, the oil baffle 14 is assigned another function, namely, to axially secure the disk carrier 24 on the planetary gear carrier 5 in the mounted state on the catch profile 11 of the web 10. For this purpose, in the area of its inside diameter, the oil baffle 14 comprises at least one angled tab 16 on a diameter that is smaller than the reference diameter of the planetary gear pins, which extends substantially parallel to the planetary bolt axis axially in the direction opposite the web 10. It is useful to arrange several angled tabs 16 across the circumference of the oil baffle 14. The disk carrier 24 comprises recesses 26 assigned to the respective tabs 16, and the tabs 16 engage in said recesses when sliding the disk carrier catch profile 25 on the web plate catch profile 11.

In the embodiment illustrated in FIG. 1, the device for axially securing the disk carrier 24 to the web 10, to which the oil baffle 14 has been added, is designed as a crimped connection with FIG. 1 showing the mounted state. When positively joining the catch profiles 25 and 11, the tabs 16 of the oil baffle 14 extend through the assigned recesses 26 of the disk carrier 24. Thereafter, using a suitable tool, a crimping 17 of the tabs 16 occurs in an area radially and/or in the circumferential direction outside the recesses 26 such that the catch profile 25 of the disk carrier 24 can no longer detach from the catch profile 11 of the web 10, due to the bent sections of the tabs 16 in the axial direction. FIG. 1 illustrates radially inward crimping. The axially securing device can be implemented both without axial clearance and with axial clearance—for example, with a defined axial clearance.

Figure 2A:
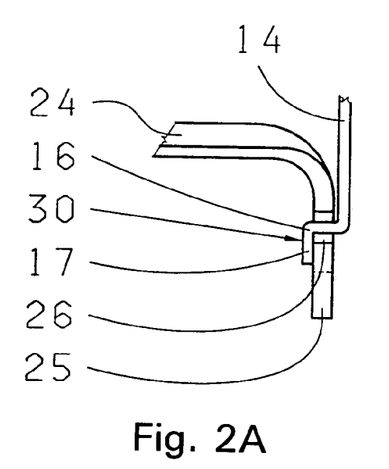
FIGS. 2A, 2B and 2C are an assembly sketch of an exemplary axially securing device with bayonet lock all of which are herein after referred to as FIG. 2.
Figure 2B:
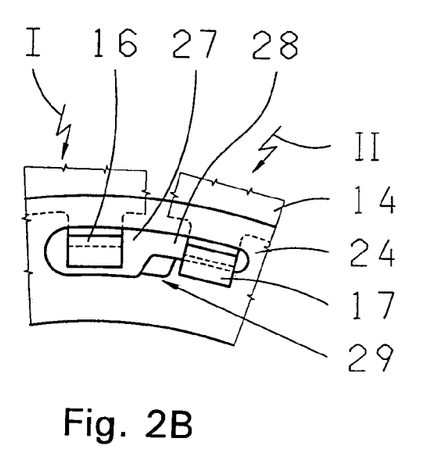
Figure 2C:
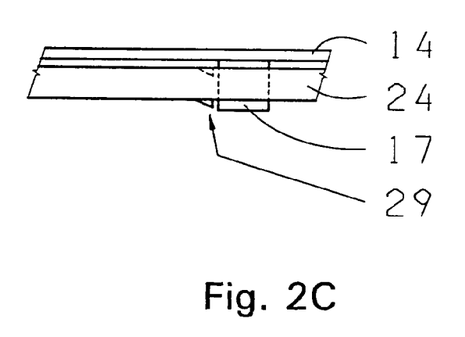

FIGS. 2A, 2B and 2C show a simplified assembly sketch for an exemplary bayonet lock as the inventive device for axially securing the gearbox element axially abutting the planetary gear carrier on the catch profile of the planetary gear carrier web in the mounted state (not illustrated to simplify the drawing). The oil baffle 14, the disk carrier 24 as an example of the gearbox element, which the oil baffle 14 abuts directly axially. Comparable with FIG. 1, the oil baffle 14 is connected to the not illustrated, web of the planetary gear carrier such that axial forces between the planetary gear carrier and disk carrier 24 can be transmitted via the oil baffle 14. Likewise, comparable to FIG. 1, torque is transmitted between the not illustrated, web plate and the disk carrier 24 in the assembled state via correspondingly designed catch profiles; the catch profile of the disk carrier 24 has been designated by reference numeral 25. The recesses of the disk carrier 24 assigned to the angled tabs 16 of the oil baffle 14 are still designated by reference numeral 26.

To implement a bayonet-like lock between the oil baffle 14 and disk carrier 24, the angled tabs 16 of the oil baffle 14 are designed elastic and spring-loaded, according to the invention, each with a spring-elastic section 30 that is double-bent at a right angle. According to the invention, the recesses 26 of the disk carrier 24 comprise a joining section 27 and a snap-fit section 28, respectively, where the snap-fit section 28 follows the joining section 27 in the same direction viewed in the circumferential direction. The joining section 27 has a larger radial extension than the snap-fit section 28. The spring-elastic sections 30 of the tabs 16 comprise a crimp 17, respectively, the radial extension of which, on one hand, is smaller than the radial extension of the joining section 27 of the disk carrier recesses 26 but, on the other hand, is larger than the radial extension of the snap-fit section 28 of the disk carrier recesses 26.

In FIG. 2, "I" designates a top view on the inventive axially securing device in the joined state; "II" shows it in the snap-fit state. When sliding the disk carrier catch profile 25 on the corresponding catch profile (not shown in FIG. 2) of the planetary gear carrier web, to which the oil baffle 14 has been added—at this point still without roll—the double-bent tabs 16, including the crimp 17, initially extend axially through the joining sections 27 of the recesses 26 of the disk carrier 24 allocated to the individual tabs 16 (joined state "I"). During the further course of assembly, the disk carrier 24 and planetary gear carrier or oil baffle 14 are rotated against each other in the circumferential direction so far until the tabs 16 extend axially through the disk carrier recesses 26 in the area of their locking sections 28 (snap-fit state "II"). Due to the larger radial extension of the bead 17 of the oil baffle tabs 16, in relation to the radial extension of the locking sections 28 of the disk carrier recesses 26, the disk carrier 24 is now axially fixed in relation to the planetary gearset or the web of the planetary gear carrier 10.

To prevent unintentional detaching of the axially securing device, the disk carrier 24 usefully comprises one or more latches 29, which are distributed across the circumference, on its side facing the crimp 17, said latches being arranged between the joining section 27 and locking section 28 of the disk carrier recesses 26, respectively, viewed in the circumferential direction. When rotating the disk carrier 24 and planetary gear carrier or oil baffle 14 out of the joined state "I" into the snap-fit state "II", the crimp 17 of the oil baffle tabs 16 slide across these latches 29, while the spring-elastic tab sections 30 briefly deforms. The special shape of the latches 29 prevents the latches 29 from rotating out of the snap-fit state "II" back into the joined state "I". From a production point of view, such latches can be manufactured easily as impressions in the disk carrier, for example.

It is clear that the roll (by way of example for the non-detachable connection) between the oil baffle 14 and planetary carrier web can only occur after the bayonet-like axially securing device has been snap-fit.

Figure 3A:
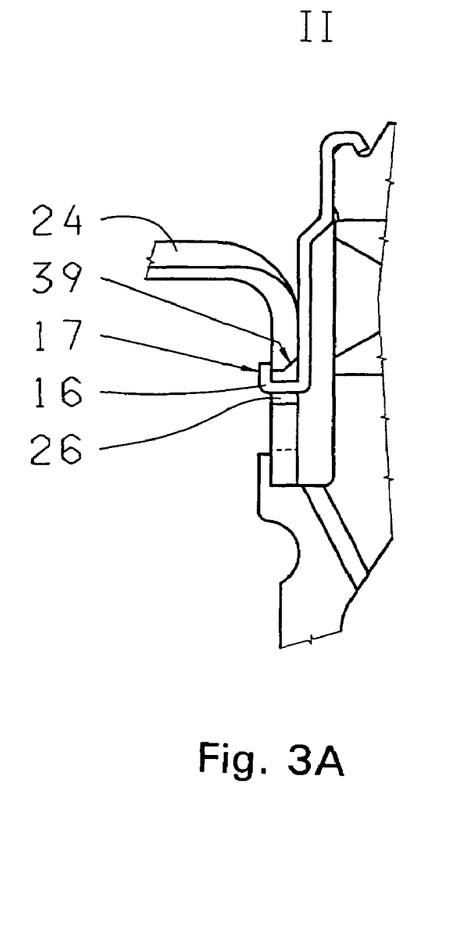
FIGS. 3A and 3B are an assembly sketch of an exemplary axially securing device with snap-fit closure both of which are herein after referred to as FIG. 3.
Figure 3B:
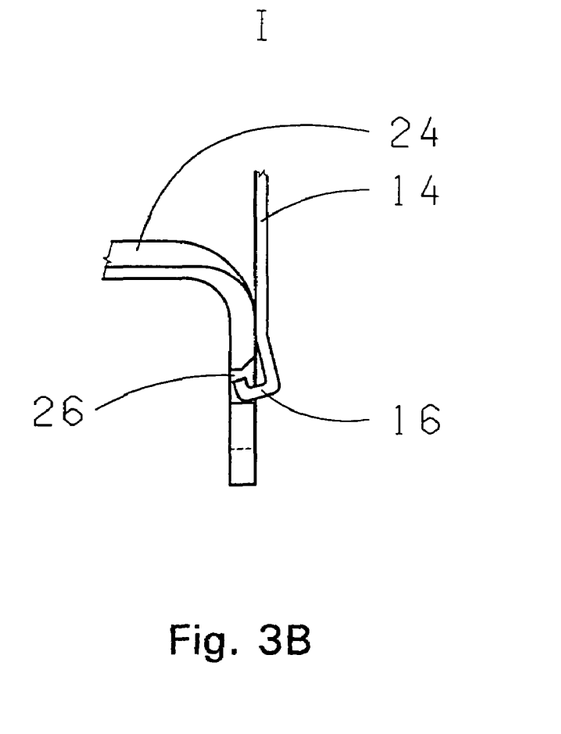

In a different embodiment of the device for axially securing the gearbox element abutting the planetary gear carrier, illustrated in FIG. 3, on the catch teeth of the planetary gear carrier web in the mounted state, the spring-elastic sections of the double-bent tabs 16 of the oil baffle 14 are designed together with the corresponding crimps 17 such that the tabs 16 deform briefly in the radial direction when sliding them axially through the recesses 26 of the disk carrier 24 that are assigned to the individual tabs 16 (joined state "I") and subsequently restore their shape so that the crimps 17 extend radially outside the corresponding disk carrier recesses 26 (snap-fit state "II"). This way the disk carrier 24 is then fixed axially in relation to the planetary gearset or the web 10 of the planetary gear carrier. Unlike in FIG. 2, the recesses 26 of the disk carrier 24 are here implemented as profiled edges with a constant radial extension. To facilitate assembly of this axially securing device designed as a snap-fit closure, a chamfer 39 or bevel may be provided on the recesses 26 of the disk carrier 24 on its side facing the web 10 to facilitate the brief deformation of the tabs 16 when entering into the corresponding disk carrier recesses 26. The crimps 17 of the tabs 16 usefully extend radially outward and overlap the disk carrier recesses 26 on their outer diameter, as illustrated in FIG. 3, in order to prevent undesirable detachment of the snap-fit closure due to the influence of centrifugal forces.

Figure 4:
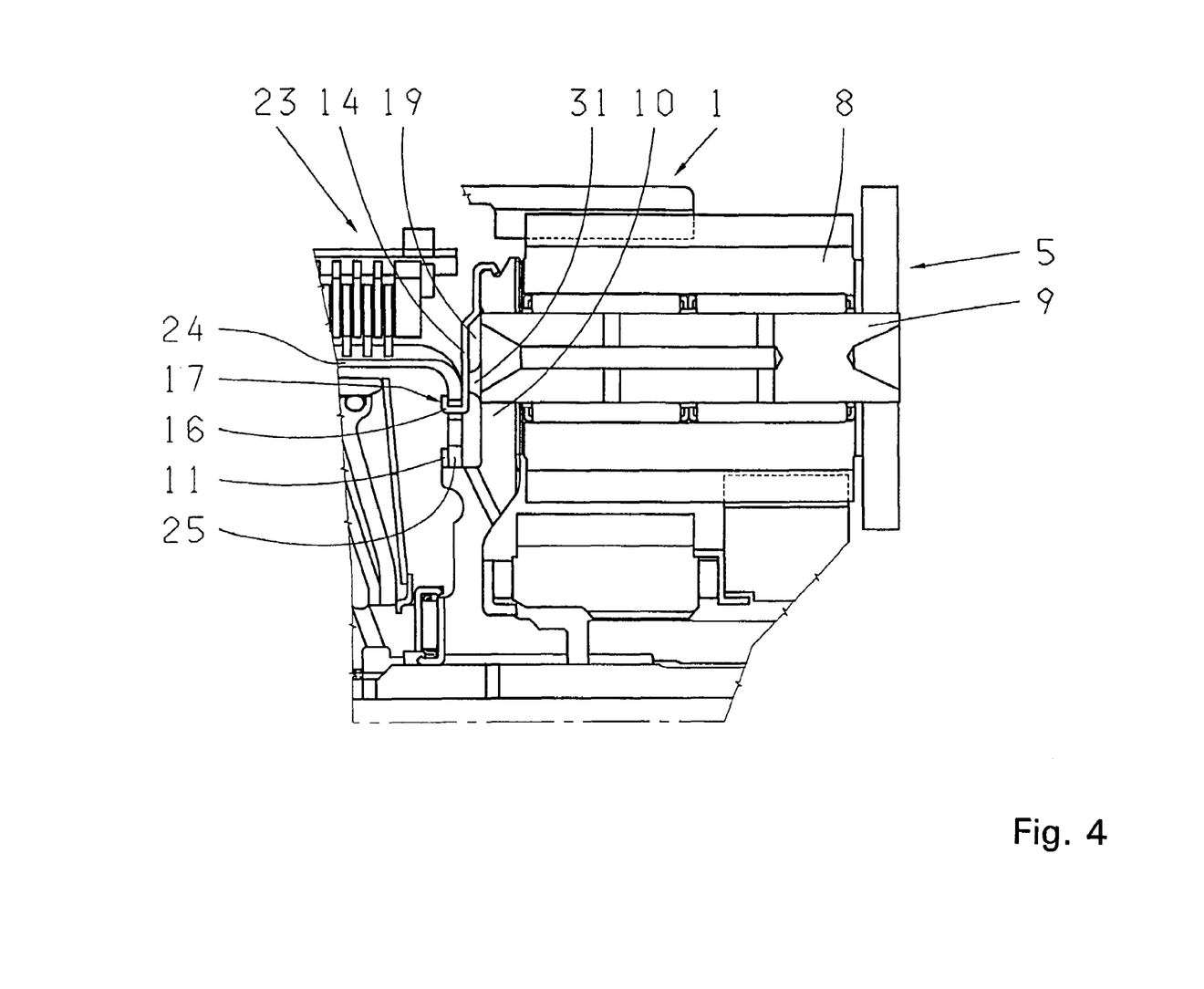
FIG. 4 is a first embodiment variation of the exemplary embodiment from FIG. 1; inventive planetary gear carrier.

FIG. 4 shows a first embodiment variation of the exemplary embodiment, illustrated in FIG. 1, of an inventive planetary gear carrier, now with an additional assembly aid for crimping of the oil baffle. Unlike in FIG. 1, the web 10 of the planetary gear carrier 5 comprises support element 31 distributed across the circumference for the crimping process. The support element 31 are arranged on the side of the web 10 facing away from the planetary gear 8 of the planetary gearset 1, on a diameter inside the lubricating oil chamber 19. On the side facing the oil baffle 14 or the disk carrier 24 of the control element 23 abutting the planetary gearset 1, the support element 31 abuts a perpendicular section of the oil baffle 14, on a diameter in the area around the disk carrier recesses 26. During the course of assembly, if the disk carrier 24 with its catch profile 25 is slid axially on the corresponding catch profile 11 of the web 10, to which the oil baffle 14 has been added, the disk carrier 24 can be supported by way of the oil baffle on the support element 31 of the web 10 in the axial direction. Such support elements can be implemented, for example, as lugs that are directly incorporated on the end face of the web or as distance bolts that are screwed or riveted or welded to the web.

As in the exemplary embodiment explained in FIG. 1, the inventive axially securing device, which fixes the gearbox element (here the disk carrier 24) abutting the planetary gear carrier 5 on the catch teeth 11 of the planetary gear carrier web 10 in the mounted state in the axial direction, is designed as a crimped closure. For this purpose the oil baffle 14—like in FIG. 1—comprises angled tabs 16 on a diameter that is smaller than the reference diameter of the planetary gear pin 9, said tabs extending axially substantially parallel to the planetary pin axis in the direction opposite the planetary gear pins 9 and during assembly of the disk carrier 24 on the catch profile 11 of the web 10 to which the oil baffle 14 has been added, axially extending through the recesses 26 of the disk carrier 24 allocated to the respective tabs 16. The support element 31 arranged in the diameter area of the recesses 26 or crimp 17 serve as a counter-bearing during subsequent bending of the tab sections, which are located on the side of the disk carrier recesses 26 facing away from the web plate after the disk carrier has axial contact with the oil baffle 14. At least during the crimping process, the oil baffle 14, therefore, rests axially against the support element 31, by way of which the assembly forces are transmitted to the (completed) planetary gear carrier. This for one reliably prevents the impermissible deformation of the oil baffle 14 caused by the crimping process but, at the same time, also enables the use of a comparatively simple crimping tool. FIG. 2 shows, by way of example, a radially outward bead.

Of course, the use of such support from the assembly forces is not limited to the exemplary crimp closure, illustrated in FIG. 2, as a device for axially securing the exemplary disk carrier in relation to the planetary gear carrier in the mounted state. In connection with other axially securing device designs, such a support can be used to also transmit axial and/or radial forces when riveting or welding or screwing the tabs of the oil baffle to the disk carrier, for example.

Figure 5:
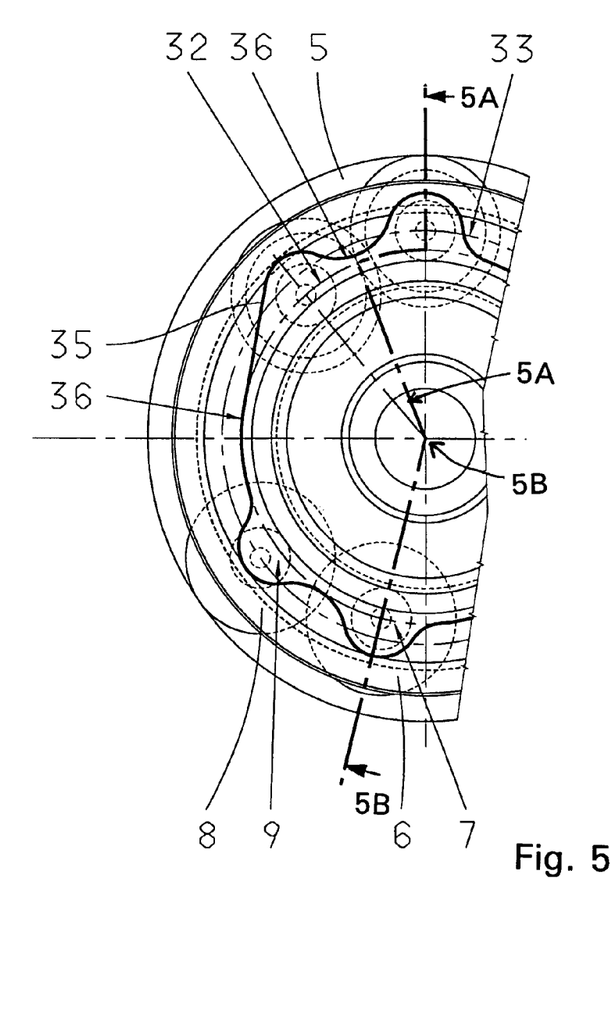
FIG. 5 is a second embodiment variation of the exemplary embodiment from FIG. 1, comprising a first seal-contact image variation on the oil baffle.
Figure 5A:
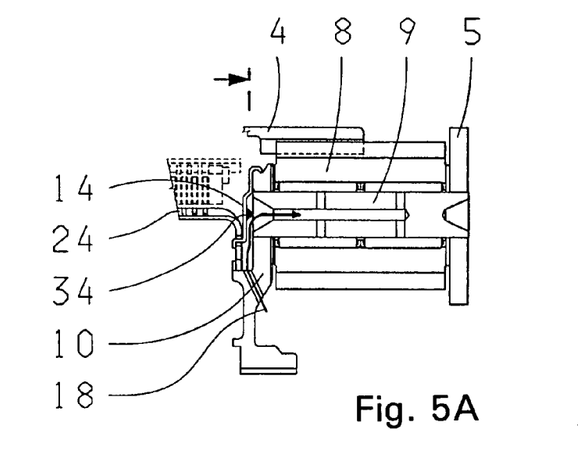
FIG. 5A is a partial cross-sectional view of planetary gear along section line 5A of 5A of FIG. 5.
Figure 5B:
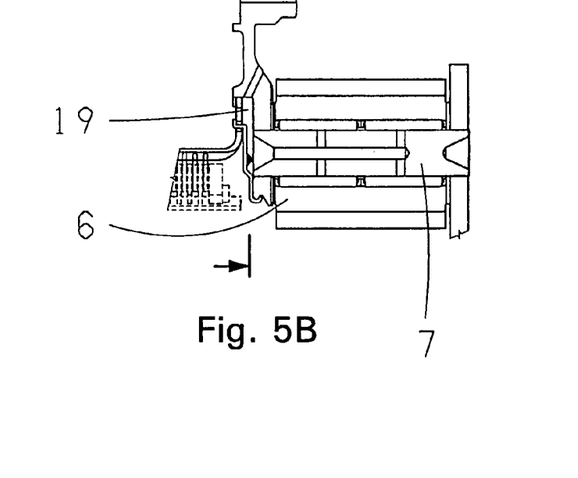
FIG. 5B is a partial cross-sectional view of planetary gear along section line 5B of 5B of FIG. 5 (all of which are hereinafter referred to as FIG. 5)

In the practice, planetary gearsets comprising several planetary gear pins that are arranged on different reference diameters are known, for example, a Ravigneaux-type planetary gearset or a plus planetary gearset with double planets. Due to the effects of centrifugal force, the planetary gears, which are arranged on a larger radius, are known to receive more lubricating oil. This creates the risk of insufficient lubrication on the planetary gear bearings arranged on the smaller radius. FIG. 5 shows a second embodiment variation of an inventive planetary gear carrier, which is based on the exemplary embodiment explained in FIG. 1 and which is suited especially for such planetary gearsets. In the sectional view, illustrated in simplified form in FIG. 5, the planetary gear carrier has still been designated by reference numeral 5, its web by numeral 10. On an inner reference diameter 32, radially inner planetary gear pin 7 has been inserted axially in the web 10, on an outer reference diameter 33 radially outer planetary gear pin 9 has been inserted. Seated on the inner planetary gear pin 7, radially inner planetary gears have been designated by numeral 6, radially outer planetary gears seated on the outer planetary gear pin 9 by numeral 8. As is typical for a Ravigneaux-type planetary gearset, the outer planetary gears 8 meshes with the internal gear 4. As in FIG. 1, on the side of the web 10 facing away from the planetary gears 6, 8, an adjoining disk carrier 24 is arranged, which is positively connected to the web 10 in the mounted state via a suitable catch profile. Likewise as in FIG. 1, the oil baffle 14 abuts the end face of the web 10 on the side of the web 10 facing away from the planetary gears 6, 8 and is rolled on the outer diameter of the web 10 such that axial forces applied on the oil baffle 14 can be transmitted from the oil baffle 14 to the planetary gear carrier 5. An explanation of the axially securing device of the disk carrier 24 relative to the planetary gear carrier 5 in the mounted state as an additional function of the oil baffle 14, which is unchanged from FIG. 1, can be foregone here.

In order to achieve a substantially even distribution of the lubricating oil, which is fed radially from the inside out in the lubricating oil chamber 19 formed by the web 10 and oil baffle 14 (lubricating oil flow 18), on all planetary gear pins 7, 9, a special seal 34 with a closed contour is arranged according to FIG. 5 axially between the oil baffle 14 and the end face of the web 10 facing the lubricating oil chamber 19 in the second embodiment variation of the inventive planetary gear carrier. In the completed state of the web 10 and oil baffle 14, the seal 32 delimits the lubricating oil chamber 19 in the radial direction with an axial seal-contact image 35, which encloses the area of the axial lubricating oil feed of the individual planetary gear pins 7, 9 radially from the outside and runs in sections 36 located in the circumferential direction between radially inner planetary gear pins 7 and radially outer planetary gear pins 9 on a diameter that is smaller than or equal to the reference diameter 32 of the radially inner planetary gear pins 5. These sections 36 of a seal-contact image 35 or of the seal 34, which are drawn in the direction of smaller diameters, cause the lubricating oil flowing from the inside into the lubricating oil chamber 19 to be distributed to the planetary gear pins 7 and 9 abutting a section 36 in the circumferential direction.

In the example illustrated in FIG. 5, the seal 34 is designed as a sealing lip that has been vulcanized directly on the oil baffle 14 in a simple manufacturing step. Of course, the seal can also be vulcanized directly on the end face of the web or also be designed as a separate component, which in the mounted state, is placed in a corresponding receiving contour (generally a groove) of the oil baffle or the web.

Figure 6:
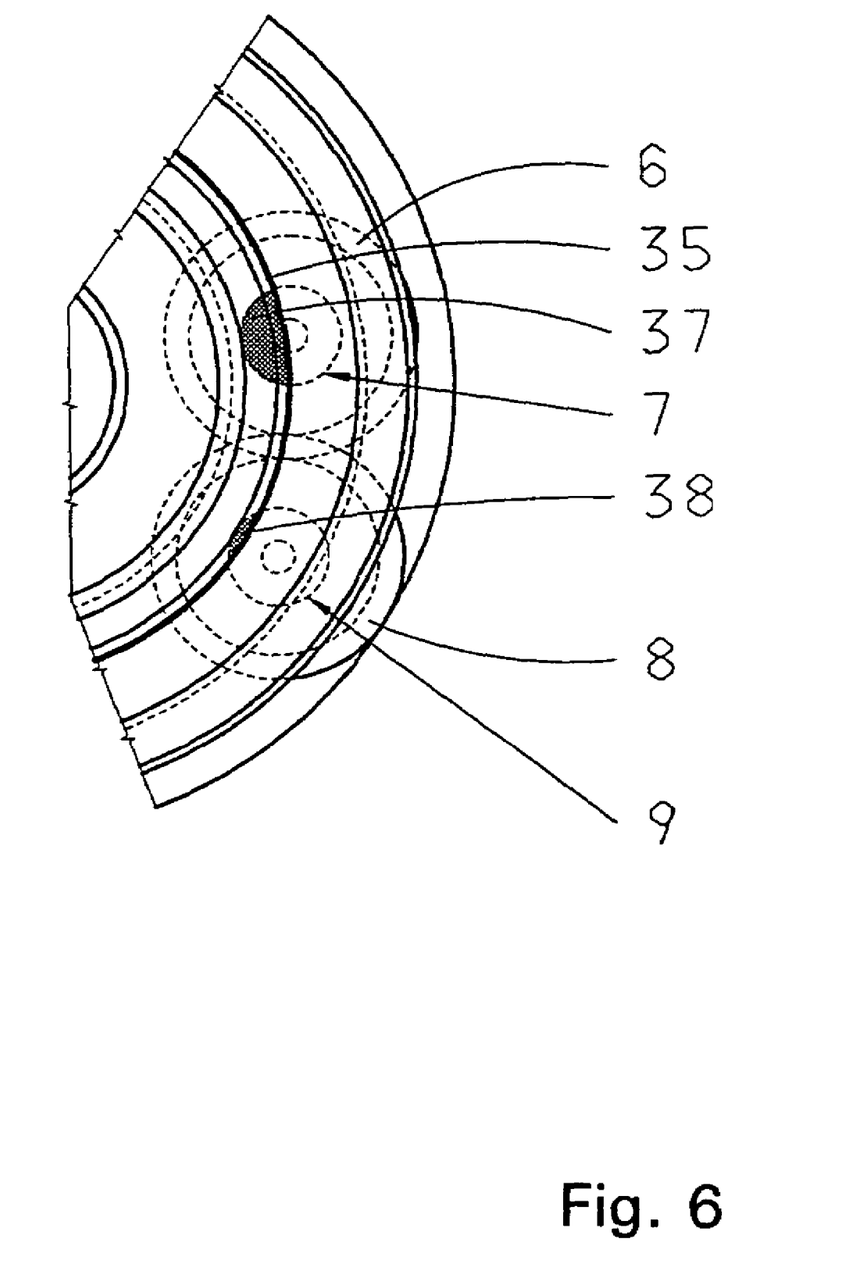
FIG. 6 is a third embodiment variation of the exemplary embodiment from FIG. 1, comprising a second seal-contact image variation on the oil baffle.

Finally, FIG. 6 shows a third embodiment variation of the exemplary embodiments of an inventive planetary gear carrier explained in FIG. 5, comprising a second seal-contact image variation on the oil baffle. Unlike in FIG. 5, the seal arranged between oil baffle and end face of the web comprises the substantially circular axial seal-contact image 35. As shown in FIG. 6, the seal-contact image 35 crosses over all planetary gear pins 7, 9 in the circumferential direction, on a diameter close to the not illustrated, reference diameter of the radially inner planetary gear 6. To achieve at least roughly even distribution of the lubricating agent for the purpose of lubricating the planetary gear bearings on all planetary gear pins 7, 9 of the inner and outer planetary gears 6, 8, a respective entrance surface 37 (hatched areas) of the lubricating oil feed in the axial lubricating holes of the radially inner planetary gear pin 7 and the respective entrance surfaces 38 (hatched areas) of the lubricating oil feed in the axial lubricating holes of the radially outer planetary gear pin 9 are adjusted to each other. As shown in FIG. 6, the entrance surface 37, allocated to the radially inner planetary gear 6, is larger than an entrance surface 38 allocated to the radially outer planetary gear 8.

REFERENCE NUMERALS 1 planetary gearset
2 first sun wheel
3 second sun wheel
4 internal gear
5 planetary gear carrier
6 radially inner planetary gear
7 radially inner planetary gear pin
8 radially outer planetary gear
9 radially outer planetary gear pin
10 web of the planetary gear carrier
11 catch profile of the web
12 undercut of the web
13 hub of the planetary gear carrier
14 oil baffle
15 roll section of the oil baffle
16 tab of the oil baffle
17 crimp of the tab
18 lubricating oil flow
19 lubricating oil chamber
20 lubricating hole of the web
21 axial lubricating hole of the planetary gear pin
22 radial lubricating hole of the planetary gear pin
23 control element
24 gearbox element abutting the planetary gear carrier; disk carrier
25 catch profile of the disk carrier
26 recess
27 joining section of the recess
28 snap-fit section of the recess
29 latch of the disk carrier
30 spring-elastic section of the baffle
31 support element of the web
32 reference diameter of the inner planetary gear pin
33 reference diameter of the outer planetary gear pin
34 seal of the oil baffle
35 seal-contact image of the seal
36 section of the seal-contact image
37 entrance surface of the lubricating oil in the axial lubricating hole of the radially inner planetary gear pin
38 entrance surface of the lubricating oil in the axial lubricating hole of the radially outer planetary gear pin
39 lug of the web; chamfer or bevel I joined state of the axially securing device
II snap-fit state of the axially securing device

The invention claimed is:

1. A planetary gear carrier (5) for a planetary gearset (1) comprising:
  a web (10) for accommodating planetary gear pins (7, 9), supporting planetary gears (6, 8) of the planetary gearset (1);
  an oil baffle (14), which axially abuts the web (10) on a side of the web (10) facing away from the planetary gears (6, 8), together with the web (10) forms a lubricating oil chamber (19) that opens towards an inside diameter and guides a quantity of the lubricating oil into lubricating holes (21, 22) of the planetary gear pins (7, 9),
  the web (10) having a catch profile (11) for a positive connection of the planetary gear carrier (5) to a gearbox element (24), which abuts the planetary gear carrier (5) axially on the side of the web (10) facing away from the planetary gears (6, 8), and
  the oil baffle (14) having a device for axially securing the gearbox element (24), abutting the planetary gear carrier (5) on the catch profile (11) of the web (10), in a mounted state.

2. The planetary gear carrier according to claim 1, wherein the catch profile (11) of the web (10) is arranged on the side of the web (10) facing away from the planetary gears (6, 8).

3. The planetary gear carrier according to claim 1, wherein the oil baffle (14) is fixedly connected to the web (10) after the baffle (14) is assembled with web (10).

4. The planetary gear carrier according to claim 3, wherein the fixed connection between the oil baffle (14) and the web (10) is arranged on a diameter greater than a reference diameter (33, 32) of the planetary gear pin (7, 9).

5. The planetary gear carrier according to claim 3, wherein the oil baffle (14) is riveted to an end face of the web (10) facing the lubricating oil chamber (19).

6. The planetary gear carrier according to claim 4, wherein the fixed connection between the oil baffle (14) and the web (10), has a roll design, and the web (10) has one of a corresponding radial groove or a corresponding undercut (12) adjacent an outer diameter of the web (10).

7. The planetary gear carrier according to claim 1, wherein the oil baffle (14) further has angled tabs (16) on a diameter that is smaller than a reference diameter (32, 33) of the planetary gear pin (7, 9), the tabs extending axially substantially parallel to a planetary pin axis in a direction opposite to the planetary gear pins (7, 9), during assembly of the gearbox element (24), abut the planetary gear carrier (5) on the catch profile (11) of the web (10), to which the oil baffle (14) has been added, and axially engage with in corresponding recesses (26) of the gearbox element (24).

8. The planetary gear carrier according to claim 7, wherein the device, which axially secures the gearbox element (24) abutting the planetary gear carrier (5) on the catch profile (11) of the web (10) in the mounted state, is a crimped closure, the tabs (16) of the oil baffle (14) extend through the corresponding recesses (26) of the gearbox element (24) after sliding a catch profile (25) of the gearbox element (24) on the catch profile (11) of the web (10) and are subsequently bent on the side of the recesses (26) facing away from the web (10).

9. The planetary gear carrier according to claim 7, wherein the device, which axially secures the gearbox element (24) abutting the planetary gear carrier (5) on the catch profile (11) of the web (10) in the mounted state, is a bayonet lock, the tabs (16) of the oil baffle (14) have a spring-elastic design and snap-fit into or onto the corresponding recesses (26) of the gearbox element (24) in a circumferential direction when sliding a catch profile (25) of the gearbox element (24) on the catch profile (11) of the web (10), and the oil baffle (14) and web (10) are only fixedly connected with each other after being snap-fitted into or onto the corresponding recesses (26).

10. The planetary gear carrier according to claim 7, wherein the device, which axially secures the gearbox element (24) abutting the planetary gear carrier (5) on the catch profile (11) of the web (10) in the mounted state, is a snap-fit closure, and the tabs (16) of the oil baffle (14) have a spring-elastic design and snap-fit into or onto the corresponding recesses (26) of the gearbox element (24) in a radial direction when sliding a catch profile (25) of the gearbox element (24) on the catch profile (11) of the web (10).

11. The planetary gear carrier according to claim 7, wherein the device, which axially secures the gearbox element (24) abutting the planetary gear carrier (5) on the catch profile (11) of the web (10) in the mounted state, is one of a riveted or a welded closure, the tabs (16) of the oil baffle (14) are riveted or welded into or onto the recesses (26) of the gearbox element (24) after sliding a catch profile (25) of the gearbox element (24) on the catch profile (11) of the web (10).

12. The planetary gear carrier according to claim 7, wherein the device, which axially secures the gearbox element (24) abutting the planetary gear carrier (5) on the catch profile (11) of the web (10) in the mounted state, is a screw connection, the tabs (16) of the oil baffle (14) extend through the corresponding recesses (26) of the gearbox element (24) after sliding a catch profile (25) of the gearbox element (24) on the catch profile (11) of the web (10), and subsequently are screwed to the gearbox element (24) on the side of the recesses (26) facing away from the web (10).

13. The planetary gear carrier according to claim 8, wherein the web (10) on a side facing the lubricating oil chamber (19), comprises at least one support element (31) in an axial extension, which is arranged on a diameter within the lubricating oil chamber (19) in an area around the recesses (26) of the gearbox element (24) abutting the planetary gear carrier (5), the oil baffle (14) rests against the support element (31) during assembly, and at least one of axial and radial forces, during assembly of the axially securing device, can be transmitted via the oil baffle (14) to the planetary gear carrier (5).

14. The planetary gear carrier according to claim 13, wherein the support segment (31) is a nose that is directly incorporated on an end face of the web (10).

15. The planetary gear carrier according to claim 13, wherein the support segment (31) is a distance pin that is one of screwed, riveted or welded to the web (10).

16. The planetary gear carrier according to claim 1, wherein the gearbox element (24), abutting the planetary gear carrier (5), is secured on the catch profile (11) of the web (10) without axial clearance.

17. The planetary gear carrier according to claim 1, wherein the gearbox element (24), abutting the planetary gear carrier (5), is secured on the catch profile (11) of the web (10) with axial clearance.

18. The planetary gear carrier according to claim 1, wherein, following assembly with the web (1), the oil baffle (14) is connected at least substantially in an oil-tight manner to the web (10).

19. The planetary gear carrier according to claim 18, wherein the at least substantially oil-tight connection, between the oil baffle (14) and the web (10), has a roll design in an area of an outside diameter of the web (10), and the web (10) comprises one of a corresponding radial groove or a corresponding undercut (12) in the area of the outside diameter.

20. The planetary gear carrier according to claim 1, wherein the planetary gear pins (7, 9) of the planetary gear carrier (5) have different reference diameters (32, 33) and a seal is arranged axially between the oil baffle (14) and the web (10), an axial seal-contact image (35) of which delimits the lubricating oil chamber (19) in a radial direction by a closed outline, which encloses an area of axial lubricating oil feed of the individual planetary gear pins (7, 9) radially outside and runs in sections (36) located in a circumferential direction between a radially inner planetary gear pin (7) and a radially outer planetary gear pin (9) on a diameter that is smaller than or equal to the reference diameter (32) of the radially inner planetary gear pins (7) so that the lubricating oil fed radially from inside into the lubricating oil chamber (19) is distributed at least substantially even among inner and outer planetary gear pins (7, 9).

21. The planetary gear carrier according to claim 20, wherein the seal (34) is a sealing lip which is vulcanized on the oil baffle (14) on a side of the oil baffle (14) facing the web (10).

22. The planetary gear carrier according to claim 20, wherein the seal is a sealing lip which is vulcanized on an end face of the web facing the lubricating oil chamber.

23. The planetary gear carrier according to claim 20, wherein the seal is a formed seal which is inserted in a corresponding receiving contour provided on one of the oil baffle or the web.

24. The planetary gear carrier according to claim 1, wherein the gearbox element (24), abutting the planetary gear carrier (5), is a disk carrier of a control element (23).

25. The planetary gear carrier according to claim 1, wherein the gearbox element, abutting the planetary gear carrier (5), is an element of a second planetary gearset.

* * * * *